(12) United States Patent
Kim et al.

(10) Patent No.: US 8,125,581 B2
(45) Date of Patent: Feb. 28, 2012

(54) ELECTRONIC DISPLAY DEVICE

(75) Inventors: Beom-Shik Kim, Suwon-si (KR); Hui Nam, Suwon-si (KR); Chan-Young Park, Suwon-si (KR); Ja-Seung Ku, Suwon-si (KR); Hyoung-Wook Jang, Suwon-si (KR)

(73) Assignee: Samsung Mobile Display Co., Ltd., Suwon-si, Gyeonggi-do (KR)

( * ) Notice: Subject to any disclaimer, the term of this patent is extended or adjusted under 35 U.S.C. 154(b) by 372 days.

(21) Appl. No.: 12/382,042

(22) Filed: Mar. 6, 2009

(65) Prior Publication Data
US 2009/0224646 A1    Sep. 10, 2009

(30) Foreign Application Priority Data
Mar. 7, 2008  (KR) .................. 10-2008-0021485

(51) Int. Cl.
*G02F 1/1335* (2006.01)
*G02F 1/1343* (2006.01)
(52) U.S. Cl. ......................................... 349/15; 349/139
(58) Field of Classification Search .................. None
See application file for complete search history.

(56) References Cited

U.S. PATENT DOCUMENTS

| 7,180,490 | B2 * | 2/2007 | Aoyama et al. ........... 345/87 |
| 7,404,642 | B2 | 7/2008 | Shestak et al. |
| 2002/0145699 | A1 * | 10/2002 | Moore ................ 349/187 |
| 2004/0114083 | A1 * | 6/2004 | Do ..................... 349/141 |
| 2006/0146208 | A1 | 7/2006 | Kim |
| 2007/0229742 | A1 * | 10/2007 | Kobayashi et al. ......... 349/123 |
| 2009/0135360 | A1 * | 5/2009 | Dessaud ................ 349/139 |

FOREIGN PATENT DOCUMENTS

| KR | 10-2006-0059775 A | 6/2006 |
| KR | 10-2006-0078165 A | 7/2006 |
| KR | 10-2006-0124849 A | 12/2006 |

* cited by examiner

*Primary Examiner* — Tina Wong
(74) *Attorney, Agent, or Firm* — Lee & Morse, P.C.

(57) ABSTRACT

An electronic display device includes a display unit including a plurality of scan lines along a first direction, a plurality of data lines along a second direction, and a plurality of pixels at intersection regions of the scan and data lines, and a barrier unit including a plurality of barrier regions extending along a direction of the data lines, the barrier unit including a plurality of first electrodes in each of the barrier regions, the first electrodes extending on a substrate along the first direction and being spaced apart from each other along the second direction, a plurality of second electrodes on the substrate at a different height than the first electrodes as determined with respect to the substrate, the first electrodes partly overlapping the second electrodes in a direction perpendicular to the substrate, and a dielectric layer on the substrate between the first and second electrodes.

19 Claims, 13 Drawing Sheets

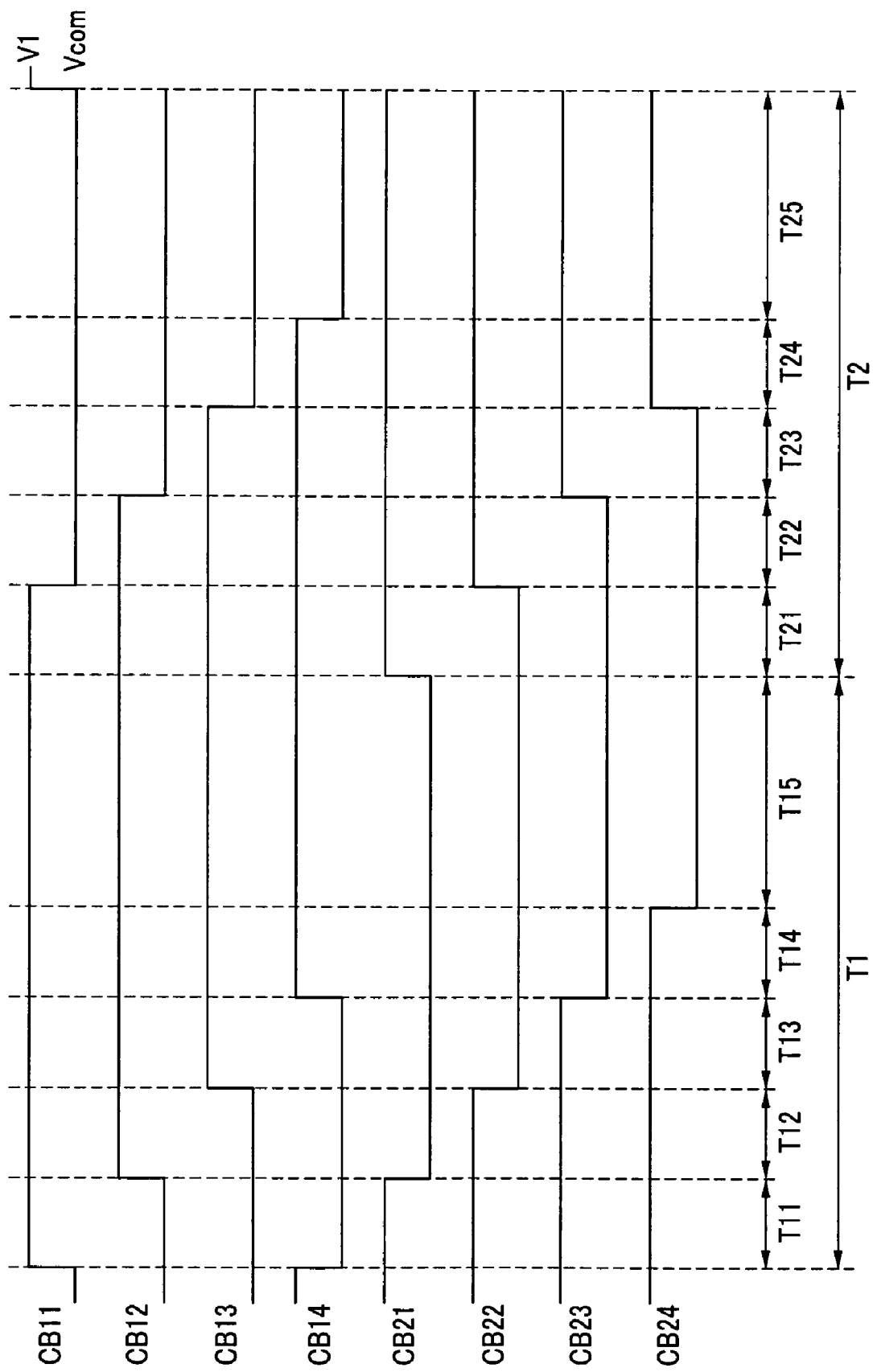

ELECTRONIC DISPLAY DEVICE

BACKGROUND

1. Field

Example embodiments relate to an electronic display device. More particularly, example embodiments relate to an electronic display device that can display a three-dimensional image.

2. Description of the Related Art

An electronic display device capable of conveying a three-dimensional (3D) image to a viewer may include, e.g., a stereoscopic display device, an autostereoscopic display device, and so forth. A stereoscopic display device refers to a display device providing different images, e.g., different 2D images, to each of the left and right eyes of the viewer to allow the viewer to feel a stereoscopic effect, e.g., view a 3D image. An autostereoscopic display device refers to a display device that uses a binocular parallax and displays a 3D image to the viewer without the use of special equipment, e.g., polarizing glasses.

A stereoscopic display device may include a display unit that has left-eye pixels and right-eye pixels for respective left-eye and right-eye images and a barrier unit that respectively divides the left-eye and right-eye images into left-eye and right-eye directions. The barrier unit may include transparent electrodes and a liquid crystal layer to optically define light interception regions and light transmission regions.

For example, the pixels, e.g., pixels arranged in a horizontal direction of a screen, may be classified into odd-numbered pixels and even-numbered pixels, and a time period for which one frame is displayed on the display device may be divided into first and second time periods. In the first time period, the odd-numbered pixels may display the left-eye image, and the even-numbered pixels may display the right-eyed image. In the second time period, the odd-number pixels may display the right-eye image, and the even-numbered pixels may display the left-eye image. Driving of the barrier unit may be synchronized with driving of the display unit, so light interception and transmission regions for the first time period may be respectively switched to the light transmission and interception regions for the second time period. Accordingly, display of all the pixels, i.e., the odd-number pixels and the even-numbered pixels, to the viewer may convey a stereoscopic image having the same resolution as a 2D image.

However, when the image for the first time period and the image for the second time period are displayed sequentially, cross-talk between the images may occur. For example, when a right-eye image for the second period is displayed from an upper portion to a lower portion of the display unit while a left-eye image for the first period is still at the lower portion of the display unit, cross-talk may occur between right and left eye images in the conventional stereoscopic display device. Further, display of the image for the first time period and the image for the second time period more than two times in one frame may require an increased driving frequency, thereby increasing electrical power consumption.

The above information disclosed in this Background section is only for enhancement of understanding of the background of the invention and therefore it may contain information that does not form the prior art that is already known in this country to a person of ordinary skill in the art.

SUMMARY

Example embodiments are therefore directed to an electronic display device that can display a three-dimensional image, which substantially overcomes one or more of the disadvantages of the related art.

It is therefore a feature of an example embodiment to provide an electronic display device having reduced crosstalk between left-eye and right-eye images.

It is therefore another feature of an example embodiment to provide an electronic display device having improved quality of a stereoscopic image.

It is yet another feature of an example embodiment to provide an electronic display device having reduced electrical power consumption.

At least one of the above and other features and advantages may be realized by providing an electronic display device, including a display unit including a plurality of scan lines along a first direction, a plurality of data lines along a second direction, the second direction intersecting the first direction, and a plurality of pixels at intersection regions of the scan and data lines, and a barrier unit in front of the display unit, the barrier unit including a plurality of barrier regions, each barrier region extending along a direction of the data lines, the barrier unit including a plurality of first electrodes in each of the barrier regions, the first electrodes extending on a substrate along the first direction and being spaced apart from each other along the second direction, a plurality of second electrodes on the substrate at a different height than the first electrodes as determined with respect to the substrate, the first electrodes partly overlapping the second electrodes in a direction perpendicular to the substrate, and a dielectric layer on the substrate between the first and second electrodes.

The first electrodes may include first extending portions at opposite longitudinal edges of the first electrodes, the first extending portions being shorter than a total length of the first electrodes, and the first extending portions overlapping the second electrodes. A width of each of the first electrodes may be greater than a gap between two adjacent first electrodes within a same barrier region of the barrier unit, the width of each first electrode being measured as a distance between outermost edges of the first extending portions of the first electrode along the second direction. The first extending portions of the first electrodes may overlap the second electrodes within a same barrier region. A group of first electrodes in one barrier region may be separated and spaced apart from a group of first electrodes in an adjacent barrier region. The first electrodes in odd-numbered barrier regions among the plurality of barrier regions of the barrier unit may not be aligned with the first electrodes located in even-numbered barrier regions among the plurality of barrier regions of the barrier unit in a length direction of the data lines. The first electrodes located in the odd-numbered barrier regions may be aligned with each other in the length direction of the data lines, and the first electrodes located in the even-numbered barrier regions are aligned with each other in the length direction of the data lines.

The electronic display device may further include a first connection electrode in each barrier region, the first connection electrode extending along the second direction and interconnecting the first electrodes in the respective barrier region. The electronic display device may further include a second connection electrode in each barrier region, the second connection electrode being disposed at a substantially same height as the first electrodes as determined with respect to the substrate, and the second connection electrode being spaced apart from the first electrodes in each of the barrier regions. The second connection electrodes may include metal. The dielectric layer may include via holes, the second electrodes being electrically connected to the second connection electrodes through the via holes. The electrodes may include second extending portions overlapping respective first electrodes in an adjacent barrier region, the second extending portions extending in the second direction. Each barrier region of the barrier unit may correspond to a respective region of the display unit, the barrier region being configured to operate separately from each other The barrier regions of the barrier unit may include first, second, third, and fourth barrier regions, and each of the second electrodes in the first barrier region may include a second extending portion overlapping a corresponding first electrode in the second barrier region, each of the second electrodes in the second barrier region may include a second extending portion overlapping a corresponding first electrode in the third barrier region, and each of the second electrodes in the third barrier region may include a second extending portion overlapping a corresponding first electrode in the fourth barrier region. The barrier regions of the barrier unit may include first, second, third, and fourth barrier regions, and first ends of the second electrodes in the second, third, and fourth barrier regions may be disposed adjacent to corresponding first electrodes in the first, second, and third barrier regions, respectively, without gaps. The barrier regions of the barrier unit may include first, second, third, and fourth barrier regions, the second electrodes in the first, second, and third barrier regions may include second extending portions at first ends thereof, the third extending portions overlapping corresponding first electrodes in the second, third, and fourth barrier regions, respectively, and second ends of the second electrodes in the second, third, and fourth barrier regions may be disposed adjacent to corresponding first electrodes in the first, second, and third barrier regions, respectively, without gaps, the second ends being opposite respective first ends of the second electrodes.

BRIEF DESCRIPTION OF THE DRAWINGS

The above and other features and advantages will become more apparent to those of ordinary skill in the art by describing in detail exemplary embodiments with reference to the attached drawings, in which:

FIG. 14 illustrates a schematic diagram of barrier driving signals transferred from a barrier driver to a plurality of connection electrodes according to an example embodiment.

DETAILED DESCRIPTION OF THE INVENTION

Figure 1:
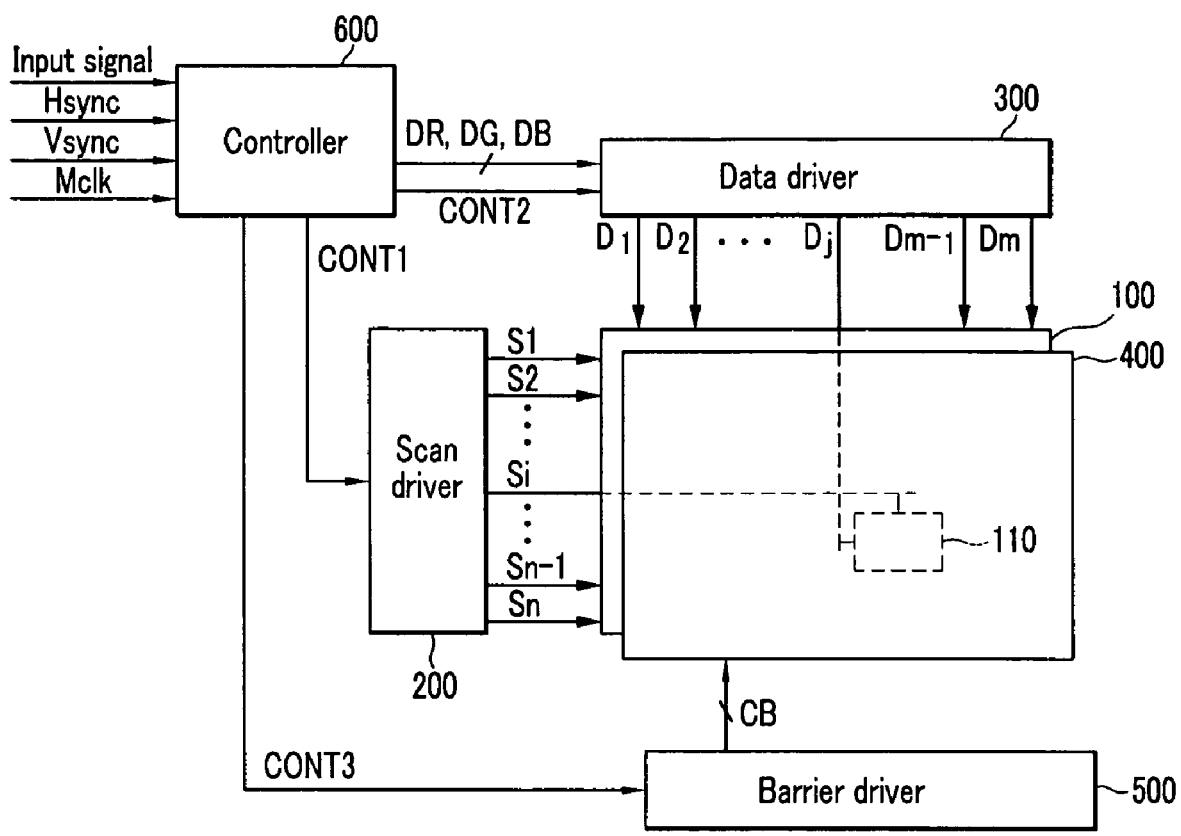
FIG. 1 illustrates a schematic diagram of an electronic display device according to an example embodiment.

Korean Patent Application No. 10-2008-0021485, filed on Mar. 7, 2008, in the Korean Intellectual Property Office, and entitled: "Electronic Display Device," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "a" and "an" are open terms that may be used in conjunction with singular items or with plural items.

FIG. 1 illustrates a schematic diagram of an electronic display device according to an example embodiment. Referring to FIG. 1, an electronic display device may include a display unit 100, scan and data drivers 200 and 300 connected to the display unit 100, a barrier unit 400 disposed in front of the display unit 100, a barrier driver 500 connected to the barrier unit 400, and a controller 600 controlling the scan and data drivers 200 and 300 and the barrier driver 500.

The display unit 100 may include a plurality of scan lines S1 . . . Sn transferring selection signals, and a plurality of data lines D1 . . . Dm transferring data signals. The data lines D1 . . . Dm may be insulated from the scan lines S1 . . . Sn, and may intersect the scan lines S1 . . . Sn. A plurality of pixels 110 may be formed at intersection regions of the scan lines S1 . . . Sn and the data lines D1 . . . Dm. Each pixel 110 may include red, green, and blue sub-pixels.

The display unit 100 may selectively display a 2D image and a stereoscopic image. When the display unit 100 displays a stereoscopic image, the pixels 110 may be classified into left-eye pixels and right-eye pixels to display left-eye and right-eye images simultaneously. The display unit 100 may be, e.g., an organic light emitting diode (OLED) display, a liquid crystal display (LCD) display, and so forth.

The scan driver 200 may be connected to the scan lines S1 . . . Sn of the display unit 100 to apply selection signals thereto, i.e., signals formed with a combination of a gate-on voltage and a gate-off voltage. For example, the scan driver 200 may sequentially apply the gate-on voltage to the scan lines S1 . . . Sn as the selection signals. When the selection signal has the gate-on voltage, a switching transistor of a pixel circuit connected to the corresponding scan line may be turned on.

The data driver 300 may be connected to the data lines D1 . . . Dm of the display unit 100 to apply data signals having respective gray levels to the data lines D1 . . . Dm. The data driver 300 may convert input image data having gray levels that are input from the controller 600 into the data signals in the form of a current or a voltage.

The controller 600 may receive an input signal, a horizontal synchronization signal Hsync, and a vertical synchronization signal Vsync from an external source, and may generate a scan control signal CONT1, a data control signal CONT2, image data signals DR, DG, and DB, and a barrier driver control signal CONT3. The controller 600 may transfer the scan control signal CONT1 to the scan driver 200. The controller 600 may further transfer the data control signal CONT2 and the image data signals DR, DG, and DB to the data driver 300. The controller 600 may further transfer the barrier driver control signal CONT3 to the barrier driver 500.

The scan control signal CONT1 may include a scan start signal, i.e., a signal controlling the start of scanning, and a first clock signal. For example, the scan start signal may control a time point from which an image of one frame starts being displayed on the display unit 100, e.g., by being synchronized with the vertical synchronization signal Vsync, i.e., a signal controlling the start of transfer of the image data of one frame. The first clock signal in the scan control signal CONT1 may control a time point at which the selection signals are transferred to the respective scan lines S1 . . . Sn, e.g., by being synchronized with the horizontal synchronization signal Hsync, i.e., a signal controlling the transfer of the input image data for pixels in one line.

The data control signal CONT2 may include a horizontal synchronization start signal, i.e., a signal controlling the start of the transfer of the data signal, and a second clock signal, i.e., a signal that has a predetermined period by being synchronized with the horizontal synchronization signal Hsync.

The input signal to the controller 600 may include 2D image data or stereoscopic image, i.e., an image containing 3-dimensional (3D) graphics data with 3D space coordinates and surface information displayed on a plane and image data of each time point. When the input signal includes stereoscopic image data, the controller 600 may generate the barrier driver control signal CONT3 for driving the barrier unit 400 in accordance with the selection signals transferred to the scan lines S1 . . . Sn, and may transfer the barrier driver control signal CONT3 to the barrier unit 400 via the barrier driver 500. The controller 600 may transfer the image data signals DR, DG, and DB through three channels by color or sequentially through one channel.

The barrier unit 400 may be divided into a plurality of regions along a first direction, so each region of the barrier unit 400, i.e., a longitudinal side of each region, may be parallel to the data lines D1 . . . Dm. The barrier unit 400 may be controlled, i.e., via the barrier driver control signal CONT3, so each region of the barrier unit 400 may be driven at a time point at which the selection signal may be transferred to one of the scan lines S1 . . . Sn corresponding to the respective regions. Structure and operation of the barrier unit 400 according to example embodiments will be described in more detail below with reference to FIGS. 3-14.

For example, when the scan driver 200 transfers a selection signal to each of the scan lines S1 . . . Sn in accordance with the first clock signal, the controller 600 may detect, e.g., via the first clock signal, a scan line corresponding to each of the transferred selection signals. That is, the controller 600 may generate a barrier driver control signal CONT3 to the barrier driver 500 with respect to the selection signals in the scan lines S1 . . . Sn, so the barrier unit 400 may be driven at the time point at which the selection signal is transferred to one of the scan signals S1 . . . Sn. Then, the barrier driver 500 may drive or stop the barrier unit 400 in accordance with the barrier driver control signal CONT3. In order to control the plurality of regions of the barrier unit 400, the barrier driver 500 may generate a plurality of barrier driving signals CB and may transfer the plurality of barrier driving signals CB to the barrier unit 400. The barrier unit 400 and the barrier driver 500 will be described in more detail below.

Figure 2:
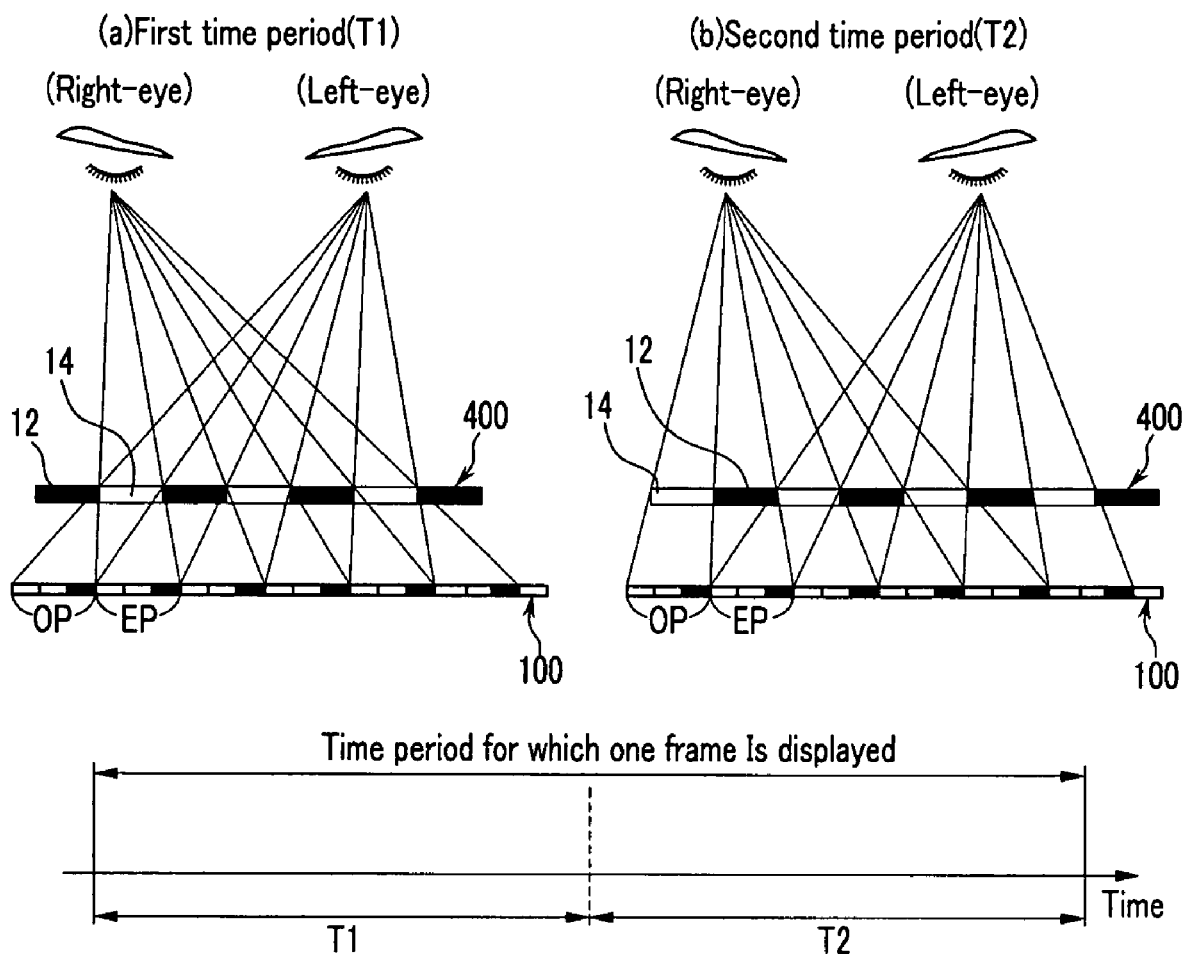
FIG. 2 illustrates a schematic diagram of a time-division driving method for an electronic display device according to an example embodiment.

The electronic display device illustrated in FIG. 1 may display a stereoscopic image using a time-division driving method. FIG. 2 illustrates a schematic diagram of a time-division driving method for an electronic display device according to an example embodiment.

FIG. 2 illustrates driving of an electronic display device by a time division method where one frame is divided into first and second time periods T1 and T2. In FIG. 2, (a) illustrates generation of a left-eye image in the first time period T1 along a horizontal direction of a screen in a first order, i.e., left-eye-right-eye-left-eye-right-eye. In FIG. 2, (b) illustrates generation of a right-eye image in the second time period T2 along the horizontal direction of a screen in a second order, i.e., right-eye-left-eye-right-eye-left-eye.

Referring to (a) in FIG. 2, in the first time period T1, odd-numbered pixels OP of the display unit 100 may function as left-eye pixels and even-numbered pixels EP may function as right-eye pixels. Accordingly, in the first time period T1, the odd-numbered pixels OP may display the left-eye image, and the even-numbered pixels EP may display the right-eye image. As illustrated in FIG. 2, light interception regions 12 and light transmission regions 14 may be alternately arranged in the barrier unit 400 in the horizontal direction of the screen to display left-eye and right-eye images, e.g., transmission regions 14 may correspond to odd-numbered pixels OP displaying left-eye images and interception regions 12 may correspond to even-numbered pixels EP displaying right-eye images. Paths along which the left-eye image and the right-eye image are respectively directed to left and right eyes of the viewer may be formed.

Referring to (b) in FIG. 2, in the second time period T2, the odd-numbered pixels OP of the display unit 100 may function as the right-eye pixels and the even-numbered pixels EP may function as the left-eye pixels. Accordingly, in the second time period T2, the odd-number pixels OP may display the right-eye image, and the even-numbered pixels EP may display the left-eye image. As illustrated in FIG. 2, the light transmission regions 14 and the light interception regions 12 may be alternately arranged in the barrier unit 400 in the horizontal direction of the screen with respect to displayed left-eye and right-eye images, e.g., transmission regions 14 may correspond to odd-numbered pixels OP displaying right-eye images and interception regions 12 may correspond to even-numbered pixels EP displaying left-eye images. Paths along which the right-eye and left-eye images are respectively directed to the right and left eyes of the viewer may be formed.

As described above, the left-eye image and the right-eye image may be separated from each other by the barrier unit 400, and may have a predetermined disparity between them. Therefore, a viewer viewing the electronic display device 100 may perceive a stereoscopic effect by obtaining depth perception similar to an actual solid object. As the time period for which one frame is displayed is divided into the first and second time periods T1 and T2, the viewer may see the stereoscopic image having the same resolution as a 2D image.

Since the selection signals may be transferred sequentially to the plurality of scan line S1 . . . Sn, the images may be displayed along a scan direction from S1 . . . Sn, i.e., along a direction parallel to the data lines D1 . . . Dm. For example, the right-eye image may be displayed in the second time period T2 after the left-eye image is displayed in the first time period T1. More specifically, the right-eye image for the second period T2 may be displayed from an upper portion to a lower portion of the display unit 100, while the left-eye image for the first period may be still at the lower portion of the display unit 100. The barrier unit 400 according to an example embodiment may be configured to separate the left-eye image from the right-eye image between the first and second time periods T1 and T2 of a frame, i.e., a time intersection point of the first and second time periods T1 and T2. In particular, the barrier unit 400 may be divided into a plurality of regions, so each region may be driven by being synchronized with an image that may be sequentially altered in the scan direction, as will be discussed in more detail below with reference to FIGS. 12-14.

Figure 3:
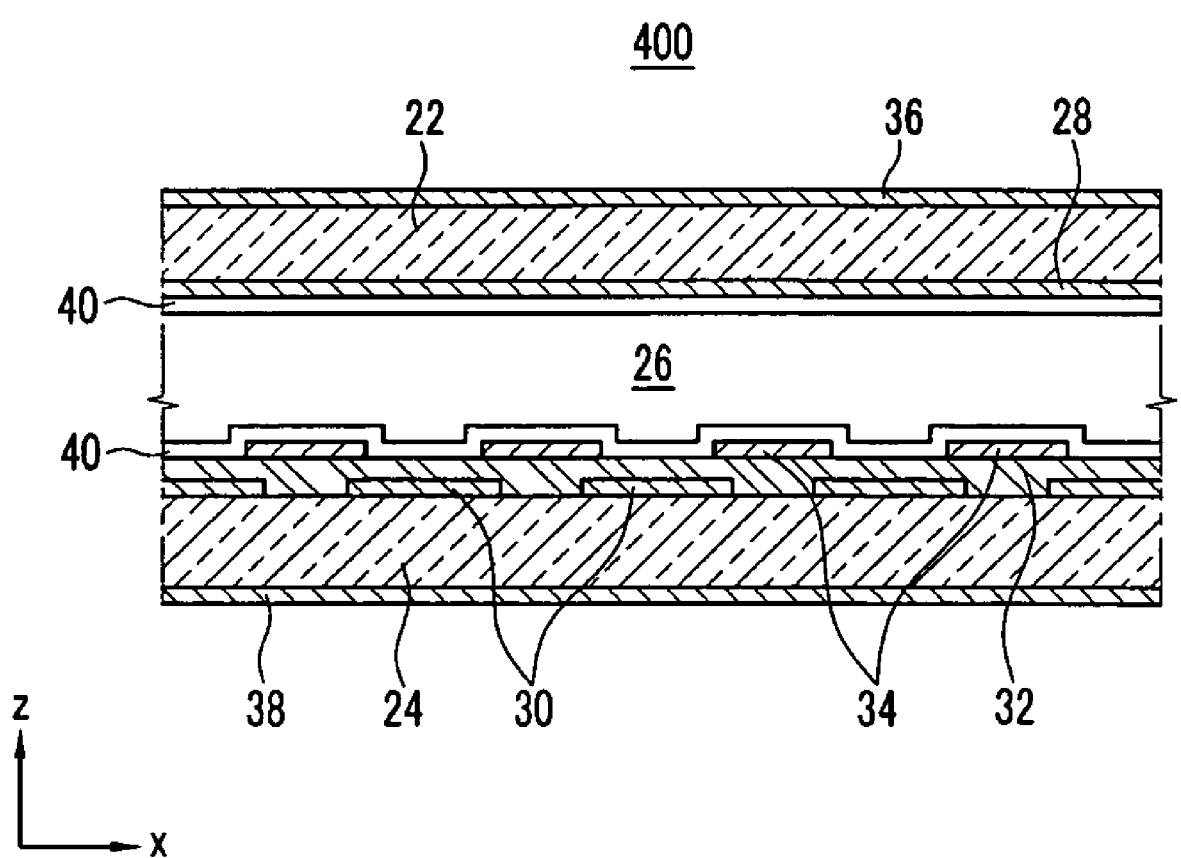
FIG. 3 illustrates a partial cross-sectional view of a barrier unit of an electronic display device according to an example embodiment.

FIG. 3 illustrates a partial cross-sectional view of the barrier unit 400. Referring to FIG. 3, the barrier unit 400 may include a first substrate 22, a second substrate 24 facing the first substrate 22 with a predetermined interval therebetween, a liquid crystal layer 26 disposed between the first and second substrates 22 and 24, a common electrode 28 formed on an inner surface of the first substrate 22, first electrodes 30 formed on an inner surface of the second substrate 24, a dielectric layer 32 formed on the inner surface of the second substrate 24 while covering the first electrodes 30, second electrodes 34 formed on the dielectric layer 32, a first polarizing plate 36 disposed on an outer surface of the first substrate 22, and a second polarizing plate 38 disposed on an outer surface of the second substrate 24.

The common electrode 28 may be formed on an entire effective surface of the first substrate 22. The first substrate 22 may be a front substrate or a rear substrate of the barrier unit 400. The common electrode 28, first electrodes 30, and second electrodes 34 may be formed of a transparent conductive material. The dielectric layer 32 may be formed of a transparent insulation material. A first orientation layer 40 may be formed on a surface of the common electrode 28, i.e., the first orientation layer 40 may face the liquid crystal layer 26. A second orientation layer 40 may be formed on a surface of the dielectric layer 32, i.e., the second orientation layer 40 may face the liquid crystal layer 26, to cover the second electrodes 34. The first and second polarizing plates 36 and 38 may be disposed such that a polarizing axis of the first polarizing plate 36 is at a right angle with respect to a polarizing axis of the second polarizing plate 38.

Figure 4:
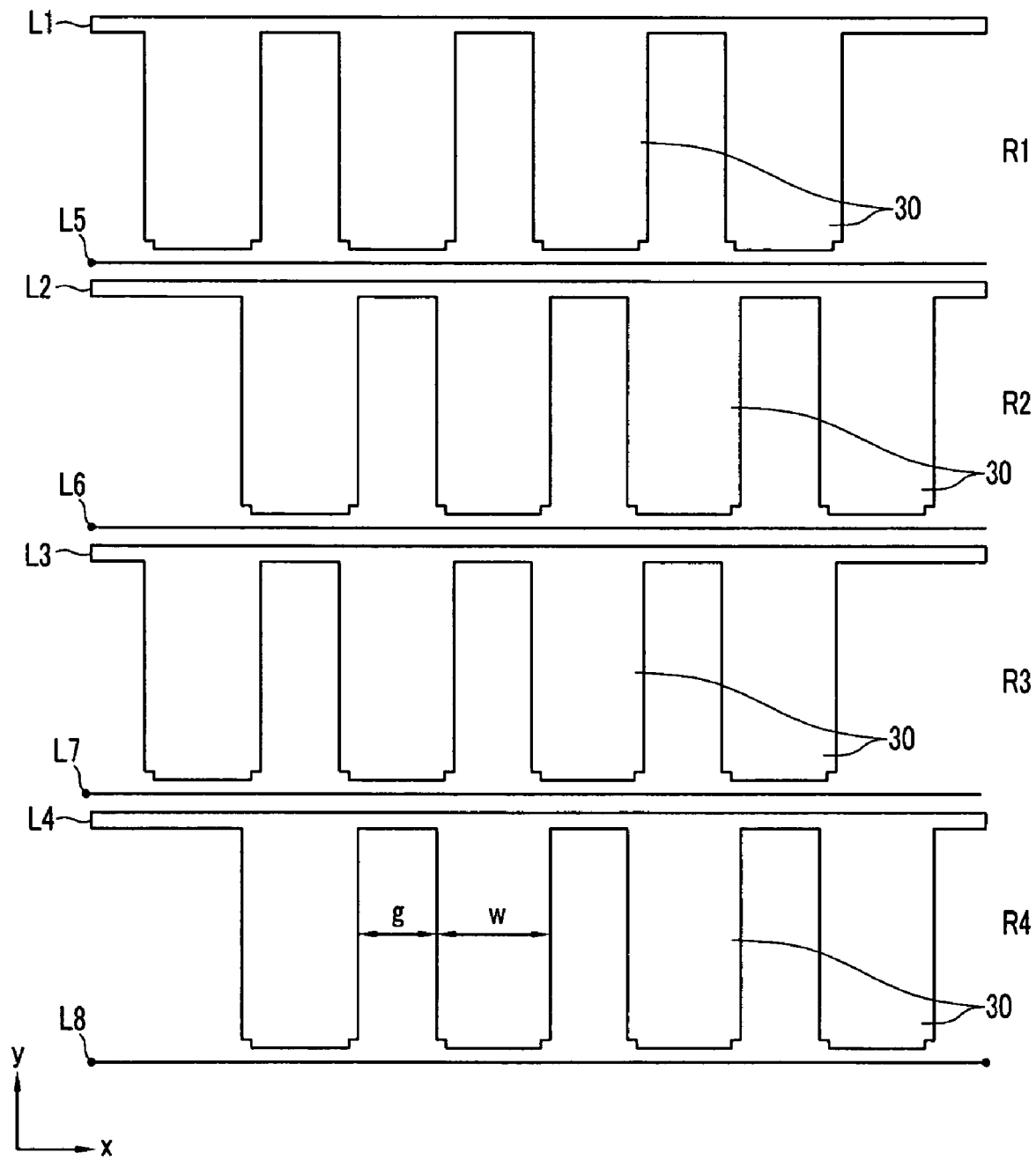
FIG. 4 illustrates a partial top view of a first electrode group of the barrier unit of FIG. 3.
Figure 5:
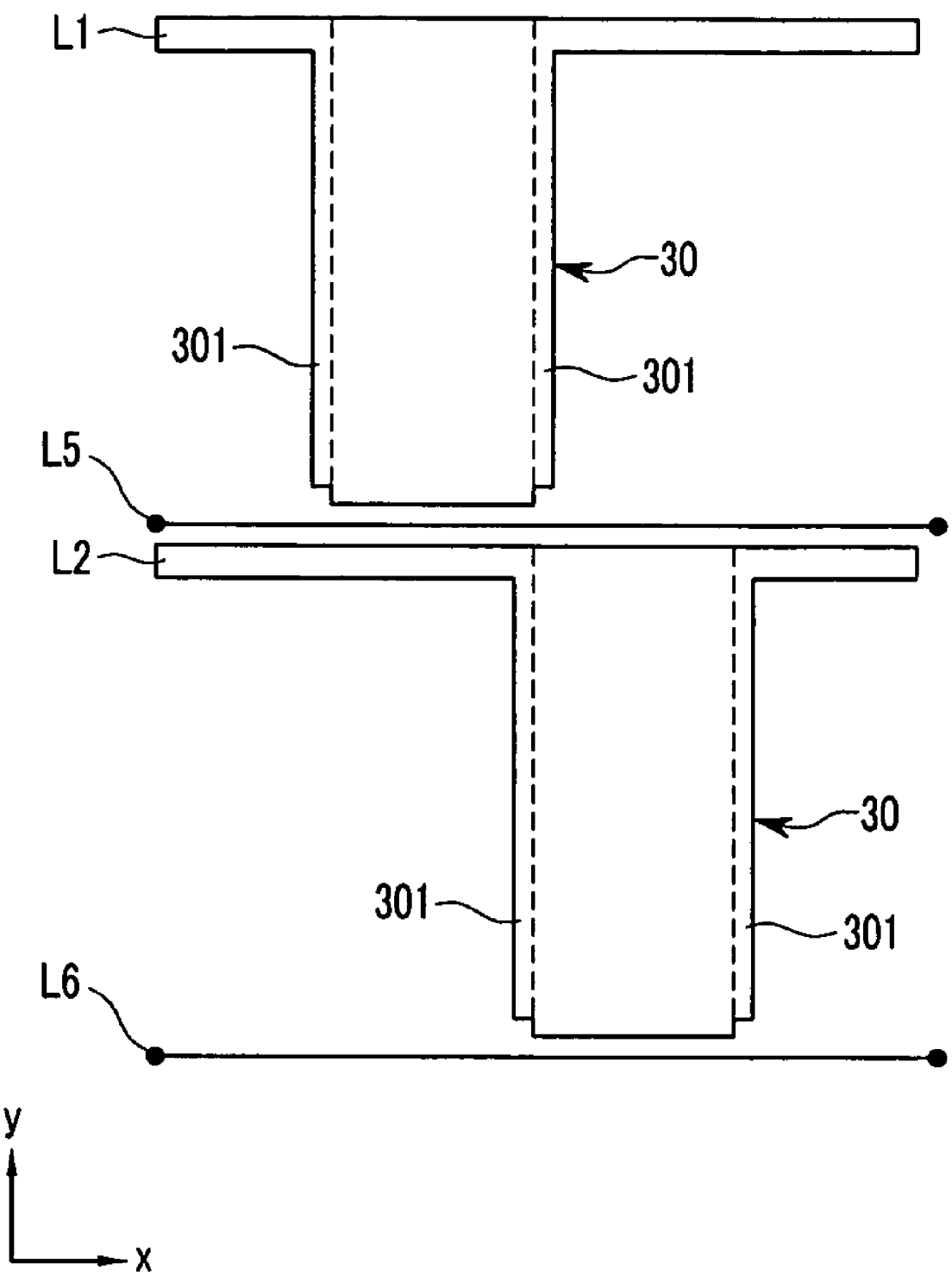
FIG. 5 illustrates an enlarged portion of FIG. 4.

FIG. 4 illustrates a partial top view of the first electrodes 30 of the barrier unit 400, and FIG. 5 illustrates a partial, enlarged top view of FIG. 4. Referring to FIGS. 4-5, the barrier unit 400 may be divided into a plurality of regions in the scan direction of the display unit 100. For example, as illustrated in FIG. 4, the barrier unit 400 may be divided into first, second, third, and fourth regions R1, R2, R3, and R4, respectively, such that each of the first through fourth regions R1 through R4 may have a longitudinal side extending along a horizontal direction, e.g., along the x-axis. It is noted that even though FIGS. 4-5 illustrate a barrier unit with four regions, the number of four regions is exemplary and any suitable number of regions may be used according to embodiments of the present invention.

A plurality of first electrodes 30 connected via a connection electrode may be positioned in each of the first through fourth regions R1, R2, R3, and R4. A group of first electrodes 30 in each region may be separated from a group of first electrodes 30 in an adjacent region. For example, the first electrodes 30 in region R1 may be separated from first electrodes 30 in region R2, e.g., first electrodes 30 in region R1 may be discrete elements with respect to first electrodes 30 in region R2 and may be completely spaced apart from each other. The first electrodes 30 may extend along a vertical direction, i.e., a longitudinal side of the first electrodes 30 may extend along the y-axis, and may be spaced apart from each other by a predetermined distance along the horizontal direction of the screen, i.e., a distance between two adjacent first electrodes 30 within a same region of the barrier unit 400 may be measured along the x-axis. Each of the first electrodes 30 may be formed in a rectangular shape extending in the scan direction of the display unit, i.e., along the y-axis. It is noted that the vertical direction may refer to the y-axis, i.e., a scanning direction, and the horizontal direction may refer to the x-axis, i.e., a length direction of the scan lines S1 . . . Sn.

Connection electrodes L1, L2, L3, and L4 may be disposed in the regions R1, R2, R3, and R4, respectively. Each of the connection electrodes L1, L2, L3, and L4 may extend along a longitudinal side of a respective region, i.e., along the length direction of the scan lines S1 . . . Sn, and may interconnect the first electrodes 30 in the respective region, i.e., a respective region of the regions R1, R2, R3, and R4. The connection electrodes L1, L2, L3, and L4 in the respective regions R1, R2, R3, and R4 will be respectively referred to as "first, second, third, and fourth connection electrodes."

The first electrodes 30 in one region may not be aligned with the first electrodes 30 in an immediately adjacent region. For example, as illustrated in FIG. 4, the first electrodes 30 in the region R1 may not be aligned with the first electrodes 30 in the region R2 along the scan direction of the display unit. As further illustrated in FIG. 4, the first electrodes 30 in region R2 may be offset along the x-axis with respect to the first electrodes 30 in region R1, so a first electrode 30 in region R1 may correspond to, i.e., may be aligned along the y-axis with, a space between two adjacent first electrodes 30 in region R2. In other words, the first electrodes 30 in region R1 and the first electrodes 30 in region R2 may be arranged in an alternating pattern.

The first electrodes 30 in alternating regions may be aligned with each other along the y-axis. For example, the first electrodes 30 in the region R1 may be disposed to be aligned with the first electrodes 30 in the region R3 along the scan direction of the display unit. In another example, the first electrodes 30 in the region R2 may be disposed to be aligned with the first electrodes 30 in the region R4 in the scan direction of the display unit.

As illustrated in FIG. 5, each of the first electrodes 30 may include first extending portions 301. For example, each of the first electrodes 30 may include two first extending portions 301 at opposite ends thereof along the y-axis. The first extending portions 301 may overlap a portion of the second electrodes 34, as will be discussed in more detail below. The first extending portions 301 may increase a width of the first electrodes 30, so a width w of each first electrode 30, i.e., a distance as measured along the x-axis between outermost edges of two first extending portions 301 of a single first electrode 30, may be greater than a gap g between two adjacent first electrodes 30 along the x-axis, as illustrated in FIG. 4. A width between innermost edges of two first extending portions 301 of a single first electrode 30, i.e., a distance along the x-axis between the dashed lines in FIG. 5, may substantially equal the gap g.

Connection electrode L5, L6, L7, and L8 may be positioned at upper ends or lower ends of the respective regions R1, R2, R3, and R4. For example, as illustrated in FIG. 4, the connection electrodes L5, L6, L7, and L8 may be positioned at lower ends, i.e., ends as determined with respect to the y-axis, of the respective regions R1, R2, R3, and R4, and may extend in parallel to the connection electrodes L1, L2, L3, and L4. The connection electrodes L5, L6, L7, and L8 in the respective regions R1, R2, R3, and R4 will be respectively referred to as "fifth, sixth, seventh, and eighth connection electrodes." Each of the connection electrodes L5, L6, L7, and L8 may interconnect the second electrodes 34 in each of the respective regions R1, R2, R3, and R4, as will be discussed in more detail below with reference to FIGS. 6-7.

The fifth, sixth, seventh, and eighth connection electrodes L5, L6, L7, and L8 may be spaced apart from the first electrodes 30 to prevent a short circuit therebetween. The fifth, sixth, seventh, and eighth connection electrodes L5, L6, L7, and L8 may be formed of a transparent conductive material or metal having excellent electrical conductivity. When the fifth, sixth, seventh, and eighth connection electrodes L5, L6, L7, and L8 are formed of metal, the fifth, sixth, seventh, and eighth connection electrodes L5, L6, L7, and L8 may be formed to have a substantially small width, i.e., along the y-axis, thereby preventing or substantially minimizing overlap with the screen, i.e., the connection electrodes L5, L6, L7, and L8 may not be seen, during the operation of the electronic display device. The transparent dielectric layer 32 may be formed to cover the first electrodes 30 and the first to eighth connection electrodes L1 to L8, and the second electrodes 34 may be formed on the transparent dielectric layer 32, as illustrated in FIG. 3.

Figure 6:
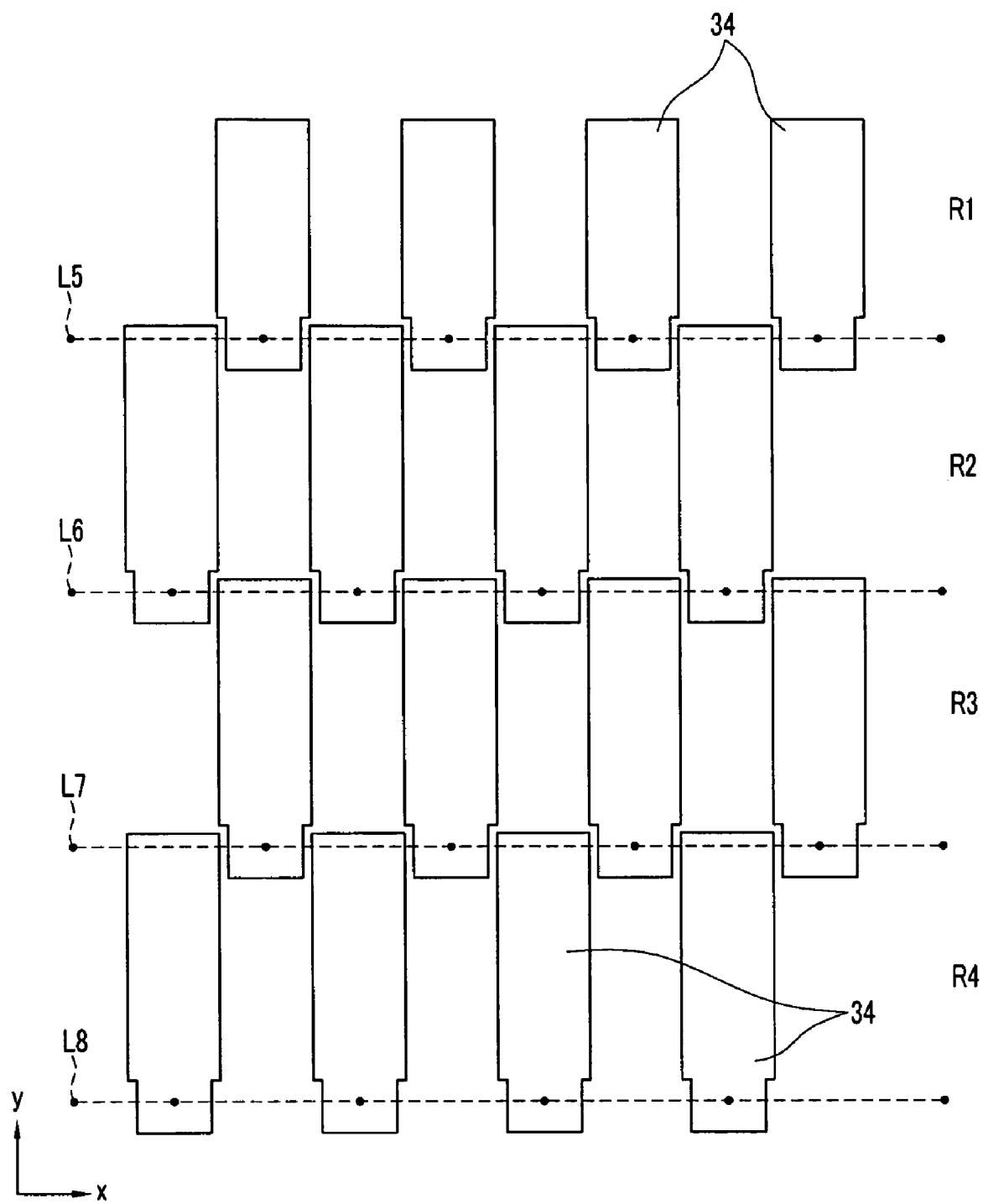
FIG. 6 illustrates a partial top plan view of a second electrode group of the barrier unit of FIG. 3.
Figure 7:
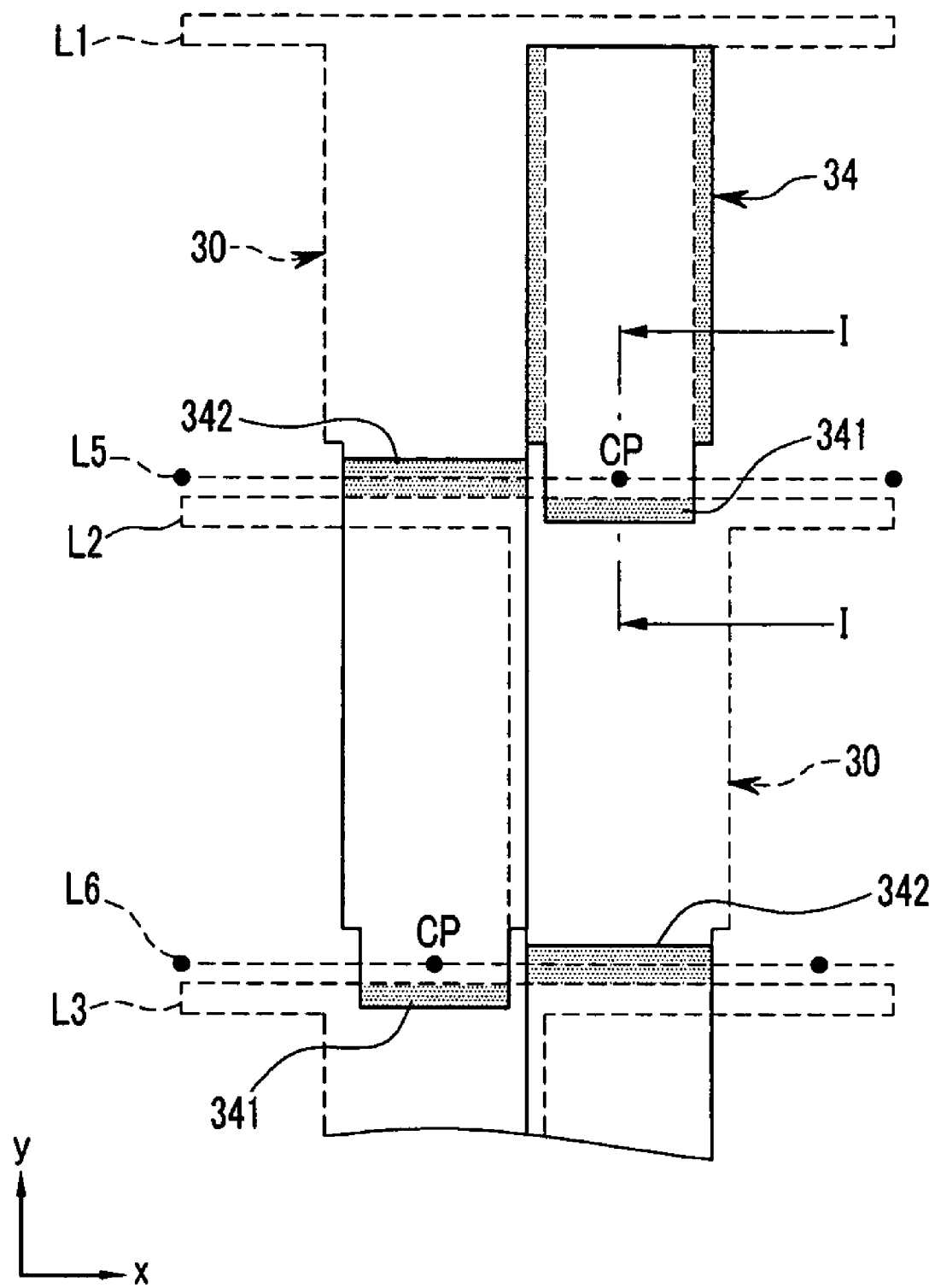
FIG. 7 illustrates an enlarged portion of FIG. 6.

FIG. 6 illustrates a partial top view of the second electrodes 34 of the barrier unit 400, and FIG. 7 illustrates a partial, enlarged top view of FIG. 6. Referring to FIGS. 6-7, a plurality of second electrodes 34 may be positioned in each of the regions R1, R2, R3, and R4. The second electrodes 34 may extend along the vertical direction, i.e., a longitudinal side of the second electrodes 34 may extend along the y-axis, and may be spaced apart from each other by a predetermined distance along the x-axis within a same region of the barrier unit 400. Each of the second electrodes 34 may be formed in a rectangular shape extending in the scan direction of the display unit.

The second electrodes 34 may be positioned to correspond to spaces between adjacent first electrodes 30. In other words, as illustrated in FIG. 3, a portion of the dielectric layer 32 may be positioned between two adjacent first electrodes 30, so each second electrode 34 may be positioned on, e.g., directly on, the portion of the dielectric layer 32 between the two adjacent first electrodes 30. Accordingly, the first and second electrodes 30 and 34 may define an alternating patter along the xz-plane, as illustrated in FIG. 3.

Figure 8:
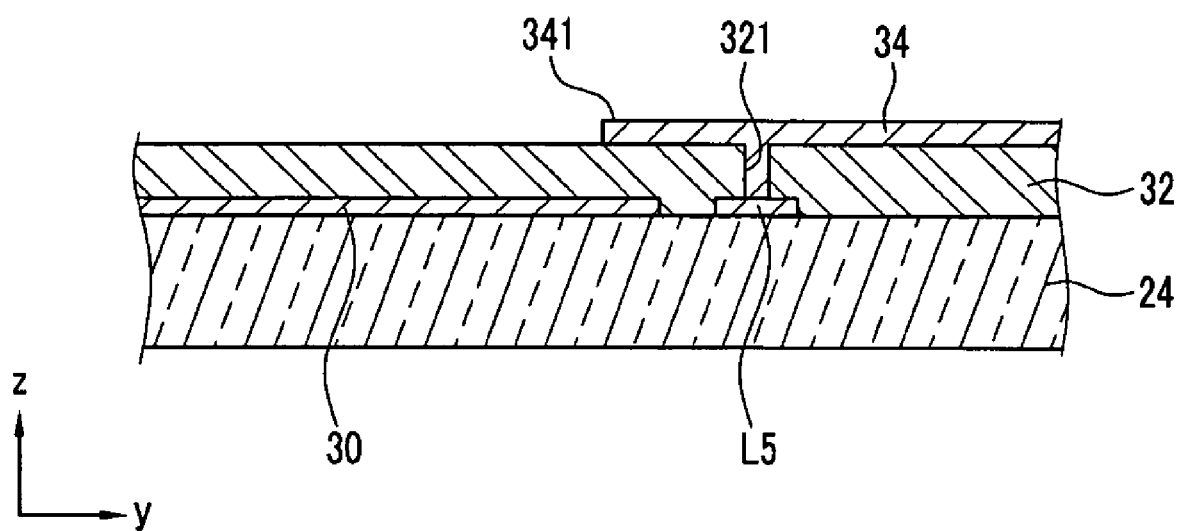
FIG. 8 illustrates a cross-sectional view along line I-I of FIG. 7.

The second electrodes 34 within each of the regions R1, R2, R3, and R4 may be connected to each other via the connection electrodes L5, L6, L7, and L8, as illustrated in FIG. 6. In particular, as illustrated in FIG. 8, the connection electrodes L5, L6, L7, and L8 may be positioned on a substantially same plane as the first electrodes 30, e.g., both the first electrodes 30 in region R1 and the connection electrode L5 may be directly on the second substrate 24. Since the second electrodes 34 may be positioned at a different height as compared to the first electrodes 30, i.e., a distance between the second electrodes 34 and the second substrate 24 may be larger than a distance between the first electrodes 30 and the second substrate 24, the second electrodes 34 within each region may be electrically connected to a corresponding connection electrode through a via hole 321, as further illustrated in FIG. 8. It is noted that FIG. 8 illustrated a cross-sectional view along line I-I of FIG. 7. In FIG. 7, contact points between the second electrodes 34 and the corresponding connection electrodes (e.g., L5 and L6) are indicated by the reference characters CP.

Referring to FIG. 7, the second electrodes 34 may include a second extending portion 341. For example, the second electrodes 34 may include a second extending portion 341 at an end thereof, e.g., the second extending portions 341 may extend along the x-axis. The second extending portion 341 may overlap a portion of a corresponding first electrode 30 in an adjacent region, as will be discussed in more detail below.

For example, as illustrated in FIG. 7, each of the second electrodes 34 in the regions R1 and R2 may include one second extending portion 341 along a lower end thereof. The second extending portions 341 in regions R1 and R2 may extend along the x-axis, as illustrated in FIG. 7, and may overlap corresponding first electrodes 30 in respective regions R2 and R3, as illustrated in FIGS. 7-8. A width of the second extending portion 341, i.e., a distance as measured along the y-axis, may be equal to or greater than widths of the second, third, and fourth connection electrodes L2, L3, and L4. In FIG. 7, a case where the width of the second extending portion 341 may be equal to the widths of the second, third, and fourth connection electrodes L2, L3, and L4 is exemplarily illustrated.

As further illustrated in FIG. 7, the second electrodes 34 may include a third extending portion 342. For example, the second electrodes 34 may include a third extending portion 342 along an end opposite the second extending portion 341. The third extending portion 342 may overlap a corresponding first electrode 30 in an adjacent region. For example, as illustrated in FIG. 7, the second electrodes 34 in the region R2 may include second extending portions 341 along lower ends thereof, i.e., along ends adjacent to region R3, and may include third extending portions 342 along upper ends thereof, i.e., along ends adjacent to region R1. Accordingly, as illustrated in FIG. 7, the second extending portions 341 of the second electrodes 34 in the region R2 may overlap first electrodes 30 in region R3, and the third extending portions 342 of the second electrodes 34 in the region R2 may overlap lower ends of corresponding first electrodes 30 in region R1. As such, the second and third extending portions 341 and 342 of the second electrodes 34 may overlap corresponding first electrodes 30 in two adjacent regions without gaps. That is, upper ends of the second electrodes 34 in the regions R2, R3, and R4 may be disposed adjacent to respective lower ends of the corresponding first electrodes 30 in the regions R1, R2, and R3 without gaps. The second electrodes 34 in the regions R2, R3, and R4 may be provided at the upper ends thereof with the respective third extending portions 342 that extend to be adjacent to the respective lower ends of the corresponding first electrodes 30 in the regions R1, R2, and R3.

Figure 9:
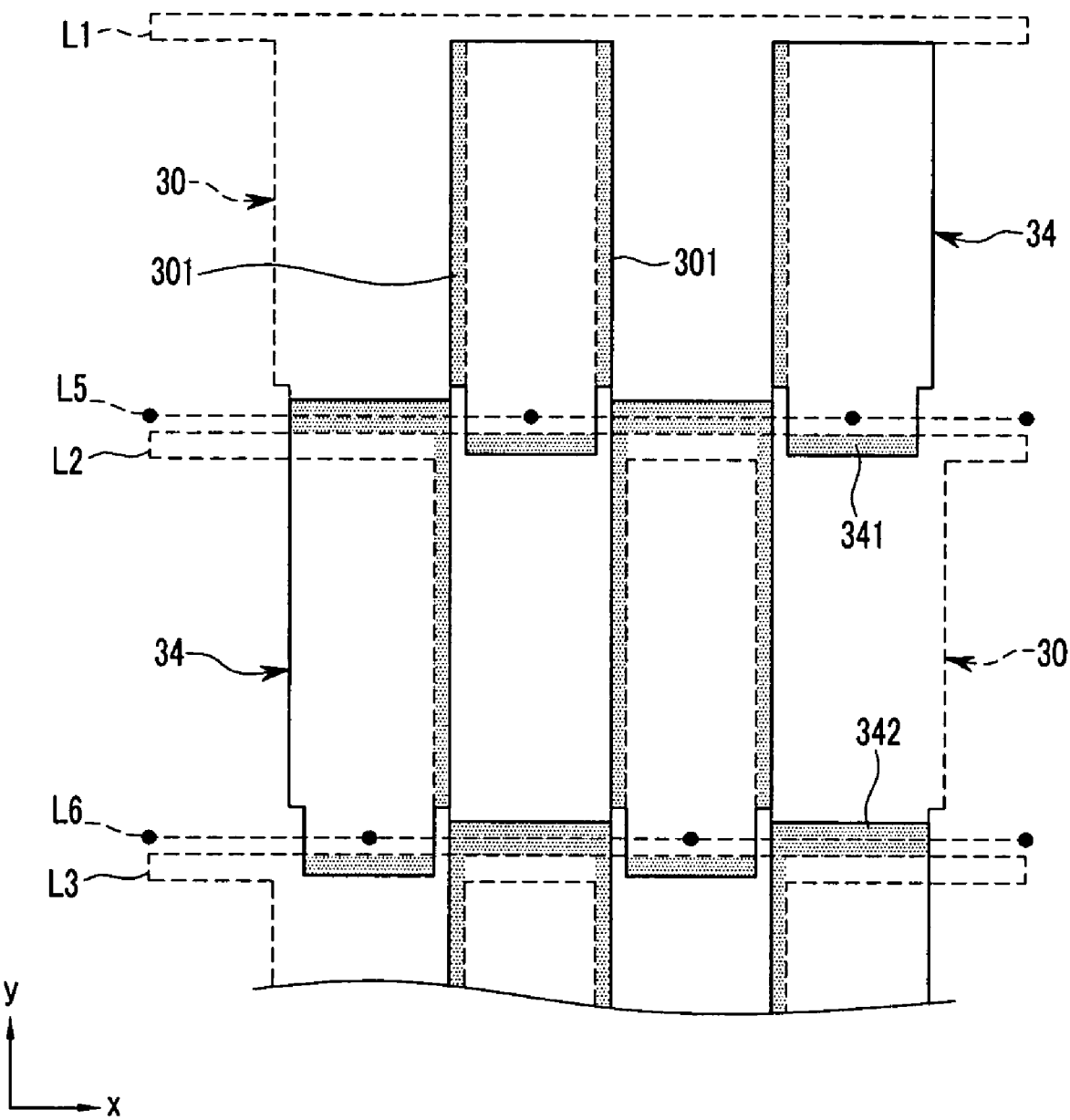
FIG. 9 illustrates a partial top view of first and second electrode groups of the barrier unit of FIG. 3.

FIG. 9 illustrates a partial top view of the first and second electrodes 30 and 34 of the barrier unit 400. Referring to FIG. 9, in each region of regions R1, R2, R3, and R4 of the barrier unit 400, the first and second electrodes 30 and 34 may partly overlap each other in a thickness direction, i.e., along the z-axis in FIG. 3, of the barrier unit 400 via the first extending portions 301. In particular, as illustrated by gray areas along the y-axis in FIG. 9, first extending portions 301 of the first electrodes 30 may overlap portions of the second electrodes 34 within the same region. Accordingly, light leaks between the first and second electrodes 30 and 34 within the same region of the barrier unit 400 may be prevented or substantially minimized when the barrier unit 400 is driven. Therefore, when the stereoscopic image is realized, crosstalk may be reduced.

In addition, as further illustrated in FIG. 9, corresponding first and second electrodes 30 and 34 of adjacent regions of regions R1, R2, R3, and R4 of the barrier unit 400 may partly overlap in the thickness direction, i.e., along the z-axis in FIG.

3, of the barrier unit 400 via the second and third extending portions 341 and 342. In particular, as illustrated by gray areas along the x-axis in FIG. 9, second and third extending portions 341 and 342 of the second electrodes 34 may overlap portions of respective first electrodes 30 in adjacent regions. That is, second and third extending portions 341 and 342 may be provided at opposite ends of the second electrodes 34 to partly overlap corresponding first electrodes 30 in the adjacent regions, i.e., second extending portions 341 overlap first electrodes 30 of a different region than the first electrodes 30 overlapped by the third extending portions 342. Accordingly, a gap between the first and second electrodes 30 and 34 of adjacent regions of the regions R1, R2, R3, and R4 of the barrier unit 400 may be prevented or substantially minimized when the barrier unit 400 is driven, thereby minimizing light leakage therethrough. Therefore, when the regions of the barrier unit 400 are selectively driven, a boundary portions between adjacent regions may not be visually recognized. The operation of the barrier unit will be described in more detail below with reference to FIGS. 10-11.

Figure 10:
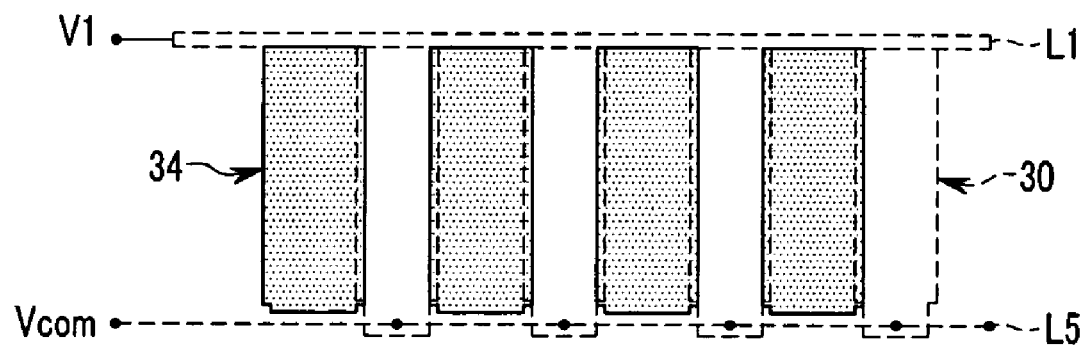
FIGS. 10-11 illustrate schematic diagrams of operating a first region of the barrier unit of FIG. 3.
Figure 11:
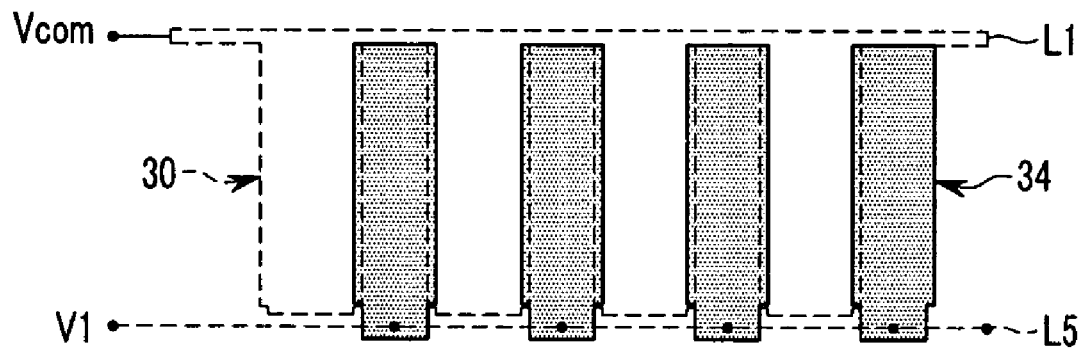

FIGS. 10-11 illustrate schematic views of operation of the region R1 of the barrier unit 400. Even though FIGS. 10-11 illustrate operation of only region R1, it is noted that operation of the regions R2, R3, and R4 is substantially the same as operation of the region R1.

Referring to FIG. 10, when the barrier unit 400 operates at a normally white mode, i.e., transmittance of light through the barrier unit 400 when no voltage is applied, a liquid crystal driving voltage V1 may be applied to the first connection electrode L1 to vary a twisting angle of liquid crystal molecules at the regions corresponding to the first electrodes 30 in the region R1 of the barrier unit 400. Therefore, regions corresponding to the first electrodes 30 in the region R1 may function as light interception regions, while remaining regions in the region R1, i.e., regions between adjacent first electrodes 30, may function as light transmission regions. At this point, the second electrodes 34 may be floated or a voltage substantially the same as the common voltage may be applied thereto, i.e., via the fifth connection electrode L5.

Referring to FIG. 11, when the liquid crystal driving voltage V1 is applied to the fifth connection electrode L5, the twisting angles of the liquid crystal molecules at regions corresponding to the second electrodes 24 may vary. Therefore, the regions corresponding to the second electrodes 34 in the region R1 may function as light interception regions, while the remaining regions, i.e., regions in the region R1 between adjacent second electrodes 34, may function as light transmission regions. At this point, the first electrodes 30 may be floated or a voltage substantially the same as the common voltage may be applied thereto, i.e., via the first connection electrode L1.

Figure 12:
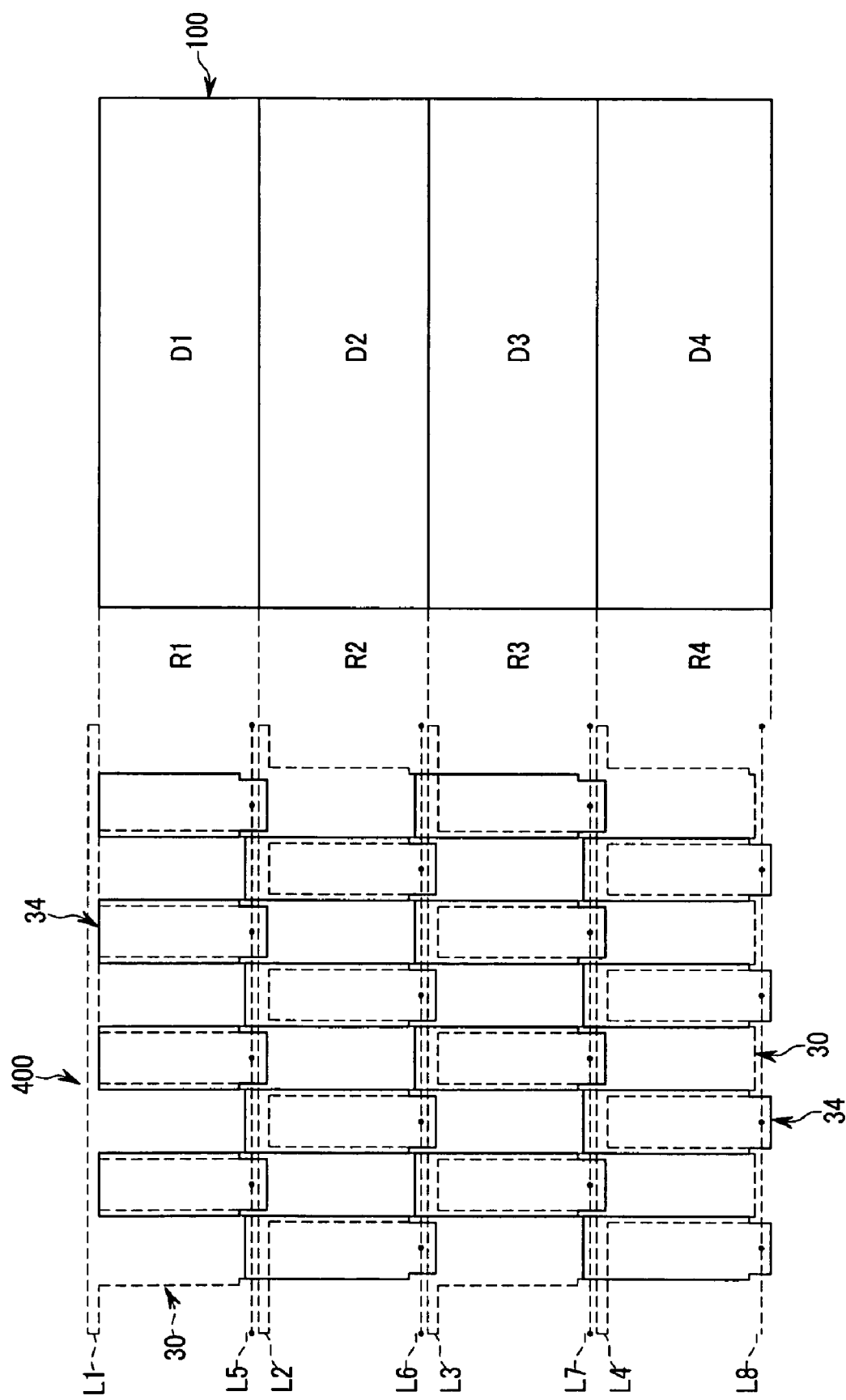
FIG. 12 illustrates a schematic diagram of a relationship between a display unit and a barrier unit of an electronic display device according to an example embodiment.

FIG. 12 illustrates a schematic diagram of a relationship between the display unit 100 and barrier unit 400 of FIG. 1. Referring to FIG. 12, the display unit 100 may be divided into four regions D1, D2, D3, and D4, and the barrier unit 400 may be divided into the four regions R1, R2, R3, and R4 corresponding to the regions D1, D2, D3, and D4 of the display unit 100. The first electrodes 30 and the second electrodes 34 may be located in each of the regions R1, R2, R3, and R4 of the barrier unit 400. The first and fifth connection electrodes L1 and L5 may be located in the region R1, and the second and sixth connection electrodes L2 and L6 may be located in the region R2. The third and seventh connection electrodes L3 and L7 may be located in the region R3, and the fourth and eighth connection electrodes L4 and L8 may be located in the region R4. Operation of the barrier unit 400 with respect to the display unit 100, i.e., operation of the electronic display device, will be described with reference to FIGS. 13 and 14 below.

Figure 13:
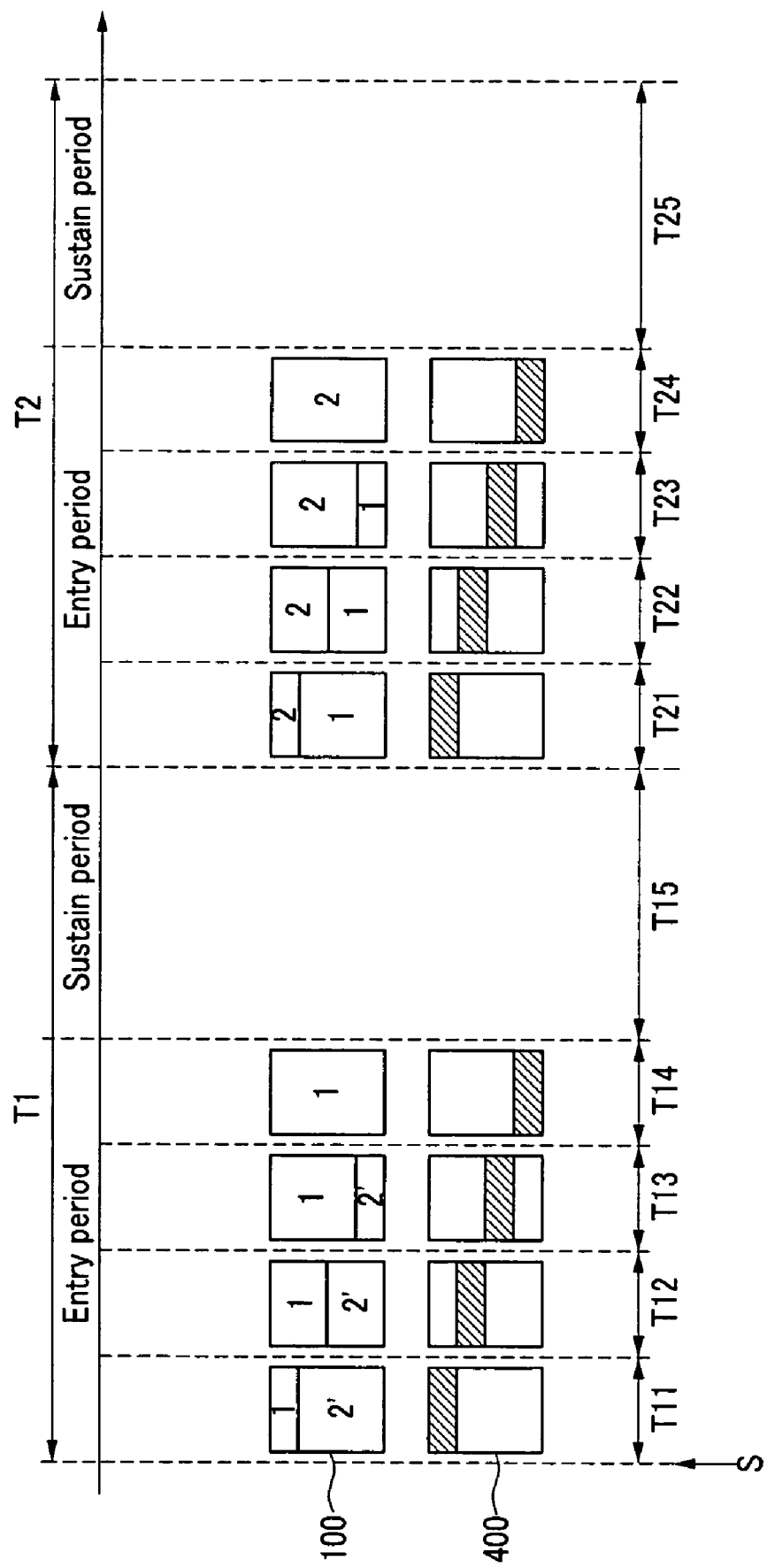
FIG. 13 illustrates a schematic diagram of a process for displaying a left-right image for a first time period and a right-left image for a second time period on a display unit according to an example embodiment.

FIG. 13 illustrates a process for displaying a left-eye image 1 on the display unit 100 for the first time period T1 and a right-eye image 2 on the display unit 100 for the second time period T2. That is, FIG. 13 illustrates states of images 1 and 2 displayed in each region of the regions D1-D4 of the display unit 100 with respect to time, i.e., in the first and second time periods T1 and T2, and corresponding states of respective regions in the barrier unit 400, i.e., with respect to synchronization of each of regions of the display unit 100.

FIG. 14 illustrates barrier driving signals transferred from the barrier driver 500 to the connection electrodes L1-L8 with respect to time. Referring to FIG. 14, barrier driving signals CB11, CB12, CB13, and CB14 may be applied to respective first, sixth, third, and eighth connection electrodes L1, L6, L3, and L8, i.e., a first group connection electrodes. Similarly, barrier driving signals CB21, CB22, CB23, and CB24 may be applied to respective fifth, second, seventh, and fourth connection electrodes L5, L2, L7, and L4, i.e., a second group connection electrodes.

The barrier driving signals CB11-CB14 and CB21-CB24 may alternately apply the liquid crystal voltage V1 and the common voltage Vcom. New images may enter the display unit 100 for entry periods T11-T14 and T21-T24. When the selection signals are sequentially applied to the scan lines S1 . . . Sn of the display unit 100, data signals may be applied to pixels corresponding to the selected scan lines along the data lines for the entry periods T11-T14 and T21-T24. The images may be sustained for sustain periods T15 and T25 in accordance with the entered data signals.

The barrier driving signals CB11-CB14 and CB21-CB24 may each have the same level as the liquid crystal voltage V1, and may be respectively applied to the first group connection electrodes L1, L6, L3, and L8, and the second group connection electrodes L5, L2, L7, and L4 at a time point at which one of the selection signals is transferred to each region of the display unit 100.

The liquid crystal driving voltage V1 may be sequentially applied to the first group connection electrodes L1, L6, L3, and L8 corresponding to the left-eye image 1 of the current frame for the first time period T1. The liquid crystal driving voltage V1 may be sequentially applied to the second group connection electrodes L5, L2, L7, and L4 corresponding to the right-eye image 2 of the current frame for the second time period T2. The common voltage Vcom may be applied to the first group connection electrodes L1, L6, L3, and L8 and the second group connection electrodes L5, L2, L7, and L4 at regions where the right-eye image 2 and the left-eye image 1 are mixed with each other, thereby forming the light interception regions.

A prior right-eye image 2', i.e., a right-eye image of a frame preceding a current frame, may be displayed on an entire screen, i.e., just before a time point at which the left-eye image 1 starts being displayed. When the left-eye image 1 of the current frame starts entering the display unit 100 at T11, display of the left-eye image 1 may progress in the scan direction of the display unit 100. For example, as illustrated in FIG. 13, display of the left-eye image 1 may start from a top portion of the display unit 100, and may progress toward a bottom portion of the display unit 100 during the first time period T1. For descriptive convenience, it is assumed that a time required for fully changing the prior right-eye image 2' to the left-eye image 1 may be the first time period T1.

More specifically, for the entry period T11 (¼ T), since the left-eye image 1 starts replacing the prior right-eye image 2', the left-eye image 1 may be displayed on the region D1 of the display unit 100, while the prior right-eye image 2' may be displayed on the regions D2, D3, and D4. At this point, the prior right-eye image 2' may be mixed with the left-eye image 1 in the region D1 during the entry period T11. According to example embodiments, however, deteriorated image quality due to mixing of the prior right-eye image 2' with the left-eye image 1 in the region D1 may be prevented by applying the barrier driving signals CB11 and CB21, i.e., including the liquid crystal driving voltage V1, to the first and fifth connection electrodes L1 and L5, respectively. In other words, the liquid crystal driving voltage V1 may be applied to the region R1 of the barrier unit 400, so the image on the region D1 of the display unit 100, i.e., a region corresponding to the region R1 of the barrier unit 400, may be blocked. As such, no image may be displayed in region D1, so even if the left-eye image 1 with the prior right-eye image 2' are mixed in the region D1 for the entry period T11 until the left-eye image 1 is displayed on the entire region D1, image quality does not deteriorate because region D1 may be blocked. At this point, the barrier driving signals CB22, CB23, and CB24 may include the liquid crystal voltage V1, and the barrier driving signals CB12, CB13, and CB14 may include the common voltage Vcom. Accordingly, while image display in region D1 may be blocked, the prior right-eye image 2' may be displayed as a stereoscopic image on the remaining regions D2, D3, and D4.

For the entry period T12 (¼ T), after the entry period T11 has elapsed, since the left-eye image 1 starts replacing the prior right-eye image 2' in the region D2, the left-eye image 1 may be displayed on the region D1 and may be written on the region D2 in the scan direction of the display unit 100. At this point, the prior right-eye image 2' may remain on the regions D3 and D4. In order to prevent deteriorated image quality in the region D2 of the display unit 100 due to mixing of the left-eye image 1 and the prior right-eye image 2', the barrier driving signals CB12 and CB22 may be respectively applied to the sixth and second connection electrodes L6 and L2 as the liquid crystal driving voltage V1, i.e., signals may be applied to first and second electrodes 30 and 34 of the region R2 in the barrier unit 400. Then, the image in the region D2 of the display unit 100 may be blocked. In addition, the barrier driving signals CB11, CB23, and CB24 may include the liquid crystal voltage V1 and the barrier driving signals CB21, CB13, and CB14 may include the common voltage Vcom, so the left-eye image 1 may be displayed as a stereoscopic image on the region D1 and the prior right-eye image 2' may be displayed as a stereoscopic image on the regions D3 and D4, while display of the region D2, i.e., a region where the left-eye image 1 and the prior right-eye image 2' may mix, may be blocked.

For the entry period T13 (¼ T), after the entry periods T11 and T12 have elapsed, since the image has started changing from the prior right-eye image 2' to the left-eye image 1, the left-eye image 1 may be displayed on the regions D1 and D2, and may be written on the region D3 in the scan direction of the display unit 100. At this point, the right-eye image 2' may remain on the region D4. At this point, since the left-eye image 1 and the prior right-eye image 2' may be mixed with each other in the region D3 of the display unit 100, the barrier driving signals CB13 and CB23 may be respectively applied to the third and seventh connection electrodes L3 and L7 as the liquid crystal driving voltage V1, so the image in the region D3 of the display unit 100 may be blocked. In addition, the barrier driving signals CB11, CB12, and CB24 may become the liquid crystal voltage V1 and the barrier driving signals CB21, CB22, and CB14 may become the common voltage Vcom. As a result, the left-eye image 1 may be displayed as a stereoscopic image on the regions D1 and D2 and the prior right-eye image 2' may be displayed as a stereoscopic image on the region D4.

For the entry period T14 (¼ T), after the entry periods T11, T12, and T13 have elapsed, since the image has started changing from the prior right-eye image 2' to the left-eye image 1, the left-eye image 1 may be displayed on the regions D1, D2, D3, and may be written on the region D4 in the scan direction of the display unit 100. At this point, since the left-eye image 1 and the prior right-eye image 2' may be mixed with each other in the region D4 of the display unit 100, the barrier driving signals CB14 and CB24 may be respectively applied to the eighth and fourth connection electrodes L8 and L4 as the liquid crystal driving voltage V1. Then, the image in the region D3 of the display unit 100 may be blocked. In addition, the barrier driving signals CB11, CB12, and CB13 may become the liquid crystal voltage V1, and the barrier driving signals CB21, CB22, and CB23 may become the common voltage Vcom. As a result, the left-eye image 1 may be displayed as a stereoscopic image on the regions D1, D2, and D3, while nothing may be displayed in the region D4.

The next period T15 may be the sustain period for which the left eye image 1 may be sustained after display thereof on all the regions D1, D2, D3, and D4 of the display unit 100. At this point, the barrier driving signals CB11-CB14 may be the liquid crystal driving voltage V1, and the barrier driving signals CB21-CB24 may be the common voltage Vcom. Accordingly, the left-eye image 1 may be displayed as a stereoscopic image on all the regions D1, D2, D3, and D4 of the display unit 100.

The following will describe operation for the second period T2. For the entry period T21 (¼ T), since the image has started changing from the left-eye image 1 to the right-eye image 2, the right-eye image 2 may be displayed on the region D1 in the scan direction of the display unit 100. At this point, the left-eye image 1 may remain on the regions D2, D3, and D4. In the entry period T21, the barrier driving signals CB11 and CB21 may be respectively applied to the first and fifth connection electrodes L1 and L5 as the liquid crystal driving voltage V1, so the image on the region D1 of the display unit 100 may be blocked. In addition, the barrier driving signals CB12, CB13, and CB14 may become the driving voltage V1, and the barrier driving signals CB22, CB23, and CB24 may become the common voltage Vcom. As a result, the left-eye image 1 may be displayed as a stereoscopic image on the remaining regions D2, D3, and D4, while no stereoscopic image may be displayed on the region D1.

For the entry period T22 (¼ T), after the entry period T21 has elapsed, since the image has started changing from the left-eye image 1 to the right-eye image 2, the right-eye image 2 may be displayed on the regions D1 and may be written on D2 in the scan direction of the display unit 100. At this point, the left-eye image 1 may remain on the regions D3 and D4. In the entry period T22, the barrier driving signals CB12 and CB22 may be respectively applied to the sixth and second connection electrodes L6 and L2 as the liquid crystal driving voltage V1, so the image on the region D2 of the display unit 100 may be blocked. In addition, the barrier driving signals CB21, CB13, and CB14 may become the liquid crystal driving voltage V1, and the barrier driving signals CB11, CB23, and CB24 may become the common voltage Vcom. As a result, the left-eye image 1 may be displayed as a stereoscopic image on the remaining regions D3 and D4, the right-eye image 2 may be displayed as a stereoscopic image in the region D1, and no stereoscopic image may be display in region D2.

For the entry period T23 (¼ T), after the entry periods T21 and T22 have elapsed, since the image has started changing from the left-eye image 1 to the right-eye image 2, the right-eye image 2 may be displayed on the regions D1 and D2 and may be written on the region D3 in the scan direction of the display unit 100. At this point, the left-eye image 1 may remain on the region D4. In the entry period T23, the barrier driving signals CB13 and CB23 may be respectively applied to the third and seventh connection electrodes L3 and L7 as the liquid crystal driving voltage V1, so the image on the region D3 of the display unit 100 may be blocked. In addition, the barrier driving signals CB21, CB22, and CB14 may become the driving voltage V1, and the barrier driving signals CB11, CB 12, and CB24 may become the common voltage Vcom. As a result, the left-eye image 1 may be displayed as a stereoscopic image on the remaining region D4.

For the entry period T24 (¼ T), after the entry periods T1, T22, and T23 have elapsed, since the image has started changing from the left-eye image 1 to the right-eye image 2, the right-eye image 2 may be displayed on the regions D1, D2, and D3, and may be written on the region D4 in the scan direction of the display unit 100. In the entry period T24, the barrier driving signals CB14 and CB24 may be respectively applied to the eighth and fourth connection electrodes L8 and L4 as the liquid crystal driving voltage V1, so the image on the region D4 of the display unit 100 may be blocked. In addition, the barrier driving signals CB21, CB22, and CB23 may become the driving voltage V1, and the barrier driving signals CB11, CB12, and CB13 may become the common voltage Vcom. As a result, the right-eye image 2 may be displayed as a stereoscopic image on the regions D1, D2, and D3.

The next period T25 may be the sustain period for which the right-eye image 2 may be sustained after displaying the right-eye image 2 on all the regions D1, D2, D3, and D4 of the display unit 100. At this point, the barrier driving signals CB21-CB24 may be the liquid crystal driving voltage V1, and the barrier driving signals CB11-CB24 may be the common voltage Vcom. Then, the right-eye image 2 may be displayed as a stereoscopic image on all the regions D1, D2, D3, and D4 of the display unit 100.

As described above, the scan direction of the display unit 100 may be identical to a length direction of the first and second electrodes 30 and 34. Therefore, even when the display unit 100 is divided into the plurality of regions D1, D2, D3, and D4, boundary portions between the regions D1, D2, D3, and D4 may not appear on the screen because the second and third extending portions 341 and 342 of the second electrodes 34 may block light leakage therethrough. Further, since the first extending portions 301 may provide an overlap between the first and second electrodes 30 and 34 within a same region of a region, light leaks between the first and second electrodes 30 and 34 may be prevented or substantially minimized, thereby suppressing crosstalk when a stereoscopic image is realized.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electronic display device, comprising
a display unit including a plurality of scan lines along a first direction, a plurality of data lines along a second direction, the second direction intersecting the first direction, and a plurality of pixels at intersection regions of the scan and data lines; and
a barrier unit in front of the display unit, the barrier unit including a plurality of barrier regions, each barrier region extending along a direction of the data lines, the barrier unit including:
  a plurality of first electrodes in each of the barrier regions, the first electrodes extending on a substrate along the first direction and being spaced apart from each other along the second direction,
  a plurality of second electrodes on the substrate at a different height than the first electrodes as determined with respect to the substrate, the first electrodes partly overlapping the second electrodes in a direction perpendicular to the substrate, and
  a dielectric layer on the substrate between the first and second electrodes.

2. The electronic display device as claimed in claim 1, wherein the first electrodes include first extending portions at opposite longitudinal edges of the first electrodes, the first extending portions being shorter than a total length of the first electrodes, and the first extending portions overlapping the second electrodes.

3. The electronic display device as claimed in claim 2, wherein a width of each of the first electrodes is greater than a gap between two adjacent first electrodes within a same barrier region of the barrier unit, the width of each first electrode being measured as a distance between outermost edges of the first extending portions of the first electrode along the second direction.

4. The electronic display device as claimed in claim 2, wherein only the first extending portions of the first electrodes overlap the second electrodes, the overlap of the first and second electrodes being within a same barrier region.

5. The electronic display device as claimed in claim 1, wherein a group of first electrodes in one barrier region are separated and spaced apart from a group of first electrodes in an adjacent barrier region.

6. The electronic display device as claimed in claim 1, wherein the first electrodes in odd-numbered barrier regions among the plurality of barrier regions of the barrier unit are not aligned with the first electrodes located in even-numbered barrier regions among the plurality of barrier regions of the barrier unit in a length direction of the data lines.

7. The electronic display device as claimed in claim 6, wherein the first electrodes located in the odd-numbered barrier regions are aligned with each other in the length direction of the data lines, and the first electrodes located in the even-numbered barrier regions are aligned with each other in the length direction of the data lines.

8. The electronic display device as claimed in claim 1, further comprising a first connection electrode in each barrier region, the first connection electrode extending along the second direction and interconnecting the first electrodes in the respective barrier region.

9. The electronic display device as claimed in claim 1, further comprising a second connection electrode in each barrier region, the second connection electrode being disposed at a substantially same height as the first electrodes as determined with respect to the substrate, and the second connection electrode being spaced apart from the first electrodes in each of the barrier regions.

10. The electronic display device as claimed in claim 9, wherein the second connection electrodes include metal.

11. The electronic display device as claimed in claim 9, wherein the dielectric layer includes via holes, the second electrodes being electrically connected to the second connection electrodes through the via holes.

12. The electronic display device as claimed in claim 1, wherein the second electrodes include second extending portions overlapping respective first electrodes in an adjacent barrier region, the second extending portions extending in the second direction.

13. The electronic display device as claimed in claim 1, wherein the barrier regions of the barrier unit include first, second, third, and fourth barrier regions; and
   each of the second electrodes in the first barrier region includes a second extending portion overlapping a corresponding first electrode in the second barrier region, each of the second electrodes in the second barrier region includes a second extending portion overlapping a corresponding first electrode in the third barrier region, and each of the second electrodes in the third barrier region includes a second extending portion overlapping a corresponding first electrode in the fourth barrier region.

14. The electronic display device as claimed in claim 1, wherein the barrier regions of the barrier unit include first, second, third, and fourth barrier regions; and
   first ends of the second electrodes in the second, third, and fourth barrier regions are disposed adjacent to corresponding first electrodes in the first, second, and third barrier regions, respectively, without gaps.

15. The electronic display device as claimed in claim 1, wherein the barrier regions of the barrier unit include first, second, third, and fourth barrier regions;
   the second electrodes in the first, second, and third barrier regions include second extending portions at first ends thereof, the third extending portions overlapping corresponding first electrodes in the second, third, and fourth barrier regions, respectively; and
   second ends of the second electrodes in the second, third, and fourth barrier regions are disposed adjacent to corresponding first electrodes in the first, second, and third barrier regions, respectively, without gaps, the second ends being opposite respective first ends of the second electrodes.

16. The electronic display device as claimed in claim 1, wherein each barrier region of the barrier unit corresponds to a respective region of the display unit, the barrier regions being configured to operate separately from each other.

17. The electronic display device as claimed in claim 1, wherein the barrier unit is external with respect to the display unit, the barrier unit being configured to be controlled by separate signals than the display unit.

18. The electronic display device as claimed in claim 1, wherein the display unit is a stereoscopic display, the barrier unit being configured to separate between left-eye and right-eye images.

19. The electronic display device as claimed in claim 2, wherein the first extending portions are substantially level with the first electrodes, the first extending portions and the first electrodes defining a uniform flat surface facing the second electrodes and having a longitudinal direction extending in a direction perpendicular to a direction of the barrier regions.

* * * * *